United States Patent

[11] 3,533,402

| [72] | Inventor | Melvin P. Siedband |
| | | Baltimore, Maryland |
| [21] | Appl. No. | 492,068 |
| [22] | Filed | Oct. 1, 1965 |
| [45] | Patented | Oct. 13, 1970 |
| [73] | Assignee | Westinghouse Electric Corporation |
| | | Pittsburgh, Pennsylvania |
| | | a corporation of Pennsylvania |

[54] CARDIAC MONITORING APPARATUS
8 Claims, 3 Drawing Figs.

[52] U.S. Cl. ........................................ 128/2.06
[51] Int. Cl. ....................................... A61b 5/04
[50] Field of Search ............................ 128/2.05,
2.06, 2.1

[56] References Cited
UNITED STATES PATENTS

| 2,827,040 | 3/1958 | Gilford | 128/2.05 |
| 3,055,356 | 9/1962 | Chouinard | 128/2.05 |
| 3,215,136 | 11/1965 | Holter et al. | 128/2.06 |
| 3,267,933 | 8/1966 | Mills et al. | 128/2.06 |
| 3,267,934 | 8/1966 | Thornton | 128/2.06 |

Primary Examiner—William E. Kamm
Attorneys—F. H. Henson, C. F. Renz and A. S. Oddi ABSTRACT: Cardiac monitor apparatus is disclosed for detecting abnormal heart conditions by sensing the ECG wave form as generated by human hearts. The incoming ECG signals are separated into two outputs and brought within predetermined amplitude levels. One of the outputs is processed by, for example, differentiation, rectification and integration, and is then compared with the unprocessed output. When an abnormal ECG signal is received the comparison of the processed and unprocessed signals will give an indication of the abnormal condition.

INVENTOR.
Melvin P. Siedband.

CARDIAC MONITORING APPARATUS

The present invention relates to cardiac monitoring apparatus, and more particularly to cardiac monitoring apparatus for detecting abnormal conditions in the heart of a living subject.

The analysis of the electrocardiogram (ECG) wave form or complex has for a number of years been a valuable diagnostic tool in determining the condition of the heart of a patient. In the usual type of electrocardiographic apparatus, a photographic or chart record is taken of the ECG wave form which must be interpreted by the visual examination of the wave form by a person trained in such analysis. In many instances it is necessary or at least highly desirable to monitor continuously the cardiac wave form of a patient under surveillance. This requires that the electrocardiographic apparatus be continuously used to provide a photographic or chart record of the electrical patient's heart and for the record to be analyzed by a person skilled in electrocardiographic techniques. Because of the necessity for the personal interpretation of the cardiographic record, this type of monitoring becomes unfeasible from the standpoint of manpower and equipment economy.

To avoid the necessity of personal monitoring, various types of cardiac monitors providing an indication of an abnormal condition of the heart of a patient have been developed. The most obvious solution to the monitoring problem is the use of apparatus which detects the amplitude and frequency of a portion of the ECG wave form. In the amplitude detecting type of cardiac monitor, the input ECG wave form is amplified to a predetermined reference value and then passed through a frequency selective filter to a detector circuit. The output signals which exceed a predetermined amplitude level are sensed and are utilized to activate an alarm circuit which indicates a malfunction (stoppage or asystole) of the heart. The QRS complex is recognized in such circuitry merely through the use of a frequency selective filter, which is chosen so that the QRS complex falls within the band pass of the filter. In this type of monitor, the gain of the circuit must be carefully controlled so that the abnormal QRS wave form will not trigger an alarm inhibiting circuit. One of the major problems of the amplitude detector type of cardiac type of monitor is its relative unreliability, since an alarm output signal may be generated or inhibited by various circuit disturbances or by diagnostically ambiguous wave forms appearing in the ECG complex. Thus, for example, changes in the contact resistance of the electrodes contacting the patient may cause the monitor to give spurious outputs. Moreover, under certain noncritical conditions ECG wave forms of the patient may include portions thereof which exceed the threshold value of the cardiac monitor even though the QRS complex may not be abnormal. This again will cause the apparatus to provide a false output. Moreover, since the cardiac wave forms constantly change in shape and amplitude even under normal conditions, it can be seen that utilizing the amplitude of such wave forms as the sole criterion for an abnormal heart condition becomes a relatively unreliable method. Also, amplitude detection circuits of this type appear to be particularly susceptible to various forms of interference, particularly 60-cycle interference, which affects the recognition circuitry. If a large number of false signals are given by the cardiac monitor, the using personnel eventually lose confidence in its effectiveness; therefore, its usefulness as a surveillance technique is diminished.

Additionally, since the apparatus must detect the amplitude of a signal falling within a frequency band, various controls must be provided in the apparatus. The usual necessary controls include: adjusting the gain to establish a threshold level, setting a filtering factor to select the band pass characteristic of the QRS wave form and adjusting alarm triggering level of the circuitry. The necessity for these various control functions thus requires a relatively skillful operator to ensure correct monitoring results from the apparatus.

It is therefore an object of the present invention to provide new and improved cardiac monitor apparatus.

It is a further object of the present invention to provide new and improved cardiac monitor apparatus which recognizes abnormal heart wave forms and, where appropriate, rejects them.

It is a further object of the present invention to provide new and improved cardiac monitor apparatus which is relatively free from false alarm signals due to spurious wave forms.

It is a still further object of the present invention to provide new and improved cardiac monitor apparatus which is highly reliable and requires relatively little initial adjustment.

Broadly, the above cited objects are accomplished by providing new and improved cardiac monitor apparatus in which the cardiac wave form of a living subject is received and processed. The processed wave shape is compared with an unprocessed wave form so that an output signal is provided from the apparatus which is indicative of the condition of the subject's heart and will provide an alarm signal when an abnormal condition exists.

These and other objects and advantages of the present invention will become more apparent when considered in view of the following specification and drawings, in which.

Figure 3:
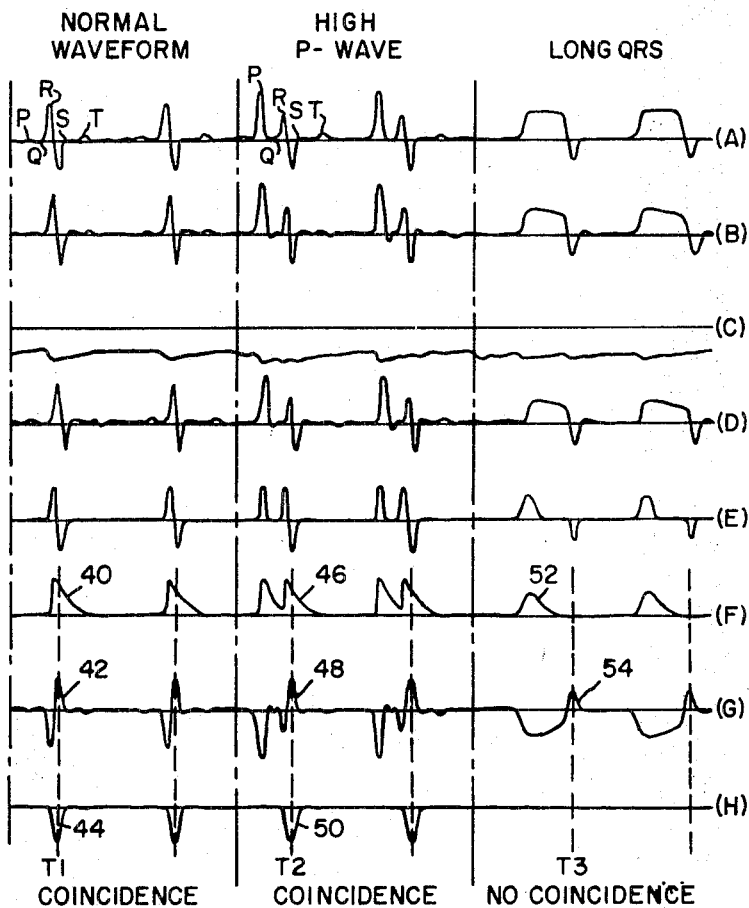
FIG. 3 is a wave form diagram including curves A through H which are developed at the various points indicated in FIGS. 1 and 2.

Referring to the block diagram of FIG. 1 and the wave form diagram of FIG. 3, the cardiac monitor of the present invention will first be discussed generally. The ECG wave form as shown in curve A of FIG. 3 is applied to an input terminal 2 of the cardiac monitor. The input terminal 2 receives the cardiac wave form from electrodes, not shown, which are attached to the patient under surveillance as is well known in the art. The curves of FIG. 3 are divided into three portions, *i.e.*, the left portion indicating a normal wave form, the center portion indicating a so-called high P-wave form, and the right portion indicating an abnormal heart condition associated with a long QRS complex.

As shown in the normal wave form portion of curve A, the ECG complex includes a P-portion that is indicative of the auricular contraction of the heart, a QRS portion which defines the QRS complex that is indicative of the ventricular contraction of the heart, and a T-portion that is indicative of the repolarization of the electrode potentials of the patient at the end of the ECG cycle. The high P-portion of the curve A shows that the P-portion of the ECG complex is abnormally high in magnitude. This, however, does not necessarily indicate that a dangerous condition in the heart exists which warrants further investigation. The long QRS wave form of curve A is indicative of an abnormal condition which is desired to be detected and an alarm signal given in response thereto so that remedial action may be taken in behalf of the patient under surveillance.

The cardiac wave forms applied to the terminal 2 are supplied to a paraphase amplifier 4 which has a single ended input at the terminal 2 and a double ended output at the leads 6 and 8. The paraphase amplifier 4 provides amplification of the input wave form and also provides a double ended output at leads 6 and 8 to drive a gain controlled push-pull stage 10. The dual outputs of the gain controlled push-pull stage 10 are provided at leads 12 and 14, with the output signal being controlled in gain within predetermined limits, as shown in curve B of FIG. 3 for the three different types of cardiac wave forms. Gain control is provided through the use of a unidirectional feedback circuit 16, which is connected between the output leads 12 and 14 and the input leads 6 and 8 of the gain control lead push-pull stage 10. The gain control signals applied to the input of the push-pull stage 10 are shown at curve C of FIG. 3. As shown, these signals are negative polarity unidirectional signals which vary with the amplitude of the input signal to the gain controlled stage. The purpose of the gain control signals is to bring the input wave form within relatively fixed amplitude limits which otherwise would not be accomplished due to amplitude variations of the input wave form. Thus, low amplitude input signals are amplified a greater degree than are high amplitude signals so that a relatively constant output is provided at the leads 12 and 14 of the gain controlled push-pull stage 10. Inconsistent amplitude input signal may be due to a number of factors, such as, incorrectly connected electrodes at the patient, drying electrode paste, and variations from patient to patient.

The gain control signals shown at curve B of FIG. 3 are applied to a push-pull summing stage 18, which provides a push-pull ECG signal output at leads 20 and 22 while cancelling the gain controlling signal. The output wave forms are respectively shown in curves G and D of FIG. 3. The D wave form is applied to a differentiating circuit 24 wherein the wave form is differentiated to provide an output at a lead 26 of the wave form as shown in curve E of FIG. 3. The differentiated wave form E is rectified in a unidirectional device 28 and applied from an output lead 30 to an integrating circuit 32. The integrated output of the integrating circuit 32 is shown in curve F of FIG. 3 and is provided at an output lead 34 of the integrating circuit 32.

A coincidence circuit 36 is provided having as inputs thereto the wave form G appearing at the lead 20 from the push-pull summing stage 18 and the wave form F appearing at the lead 34 of the integrating circuit 32. The coincidence circuit 36 is so designed that an output signal will be provided at an output lead 38 thereof whenever there is a time coincidence of signals having a positive polarity at its input leads 20 and 34. The output wave form is shown in the curve H of FIG. 3. Thus, when the wave forms of the curves F and G have a positive polarity in time coincidence, an output pulse, due to, for example, the conduction of a vacuum tube, will be provided at the lead 38 of the coincidence circuit 36.

This can readily be seen by a consideration of curves F, G and H of FIG. 3. Considering first the normal wave form, at a time T1, when the wave forms F and G from the integrating circuit and the push-pull summing stage 18 are applied to the coincidence circuit 36, a pulse 40 of curve F has a positive polarity, while a pulse 42 of the curve G also has a positive polarity. The coincidence of the positive polarity pulses 40 and 42 causes the coincidence circuit 36 to provide an output signal at the time T1 shown as the pulse 44 of curve H. The output lead of the coincidence circuit 36 is applied to an alarm circuit 39 which is so designed that an alarm indication, for example, audible or visible is given upon the failure of coincidence to occur.

Figure 1:
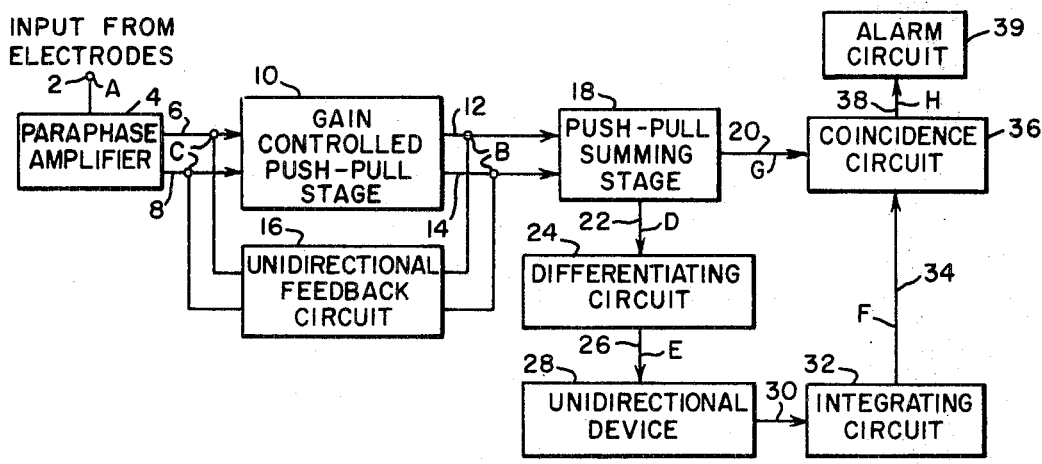
FIG. 1 is a block diagram showing the cardiac monitor apparatus of the present invention.

A comparison of the high P wave forms of curves F, G and H shows that the occurrence of the high amplitude P portion of the ECG wave form does not cause a false alarm to be given in the monitoring apparatus of FIG. 1. Thus, at a time T2 when time coincidence is to occur at the coincidence circuit 36, a positive polarity pulse 46 appears at the lead 34 shown in curve F. While at the time T2 at the lead 20, a positive polarity pulse 48 appears at the other input to the coincidence circuit 36 as shown in curve G. The time coincidence of the positive polarity pulses 46 and 48 causes the coincidence circuit 36 to provide an output pulse 50; thus, with no resulting alarm being given.

If an abnormal condition exists in the heart as indicated by a long QRS complex, it is necessary that an alarm signal be provided by the cardiac monitor so that remedial action may be taken. Referring to the long QRS section of curves F, G and H of FIG. 3, at the time T3, an alarm output is provided by the monitor since no coincidence of positive polarity signals exists. As shown in curve F, no positive polarity signal appears in this wave form since a pulse 52 terminates before the time T3. In curve G, a pulse 54 does appear, however, at the time T3. But since the wave form of curve F does not include a positive polarity pulse, there is no coincidence of positive polarity signals applied at the time T3 to the coincidence circuit 36. Therefore, as shown in curve H no output pulse is supplied at the lead 38 of the coincidence circuit 36. Thus, the alarm circuit 39 is activated indicating that a heart malfunction has occurred.

It can be seen that the monitor apparatus of FIG. 1 depends upon the particular wave form of the QRS complex to determine whether an abnormal QRS complex appears. This is in contradistinction to sensing merely the amplitude and frequency bandpass of the wave shape which introduces considerable ambiguity and false alarms into the monitoring function. Moreover, the apparatus of FIG. 1 is readily adaptable for use under varying conditions which occur due to changes in patients and electrode operations because of its gain control feature. Also, since the ECG wave form of a given cycle is compared with itself, the normal variation of the ECG wave form from heartbeat to heartbeat does not adversely affect the operation of the circuit.

Figure 2:
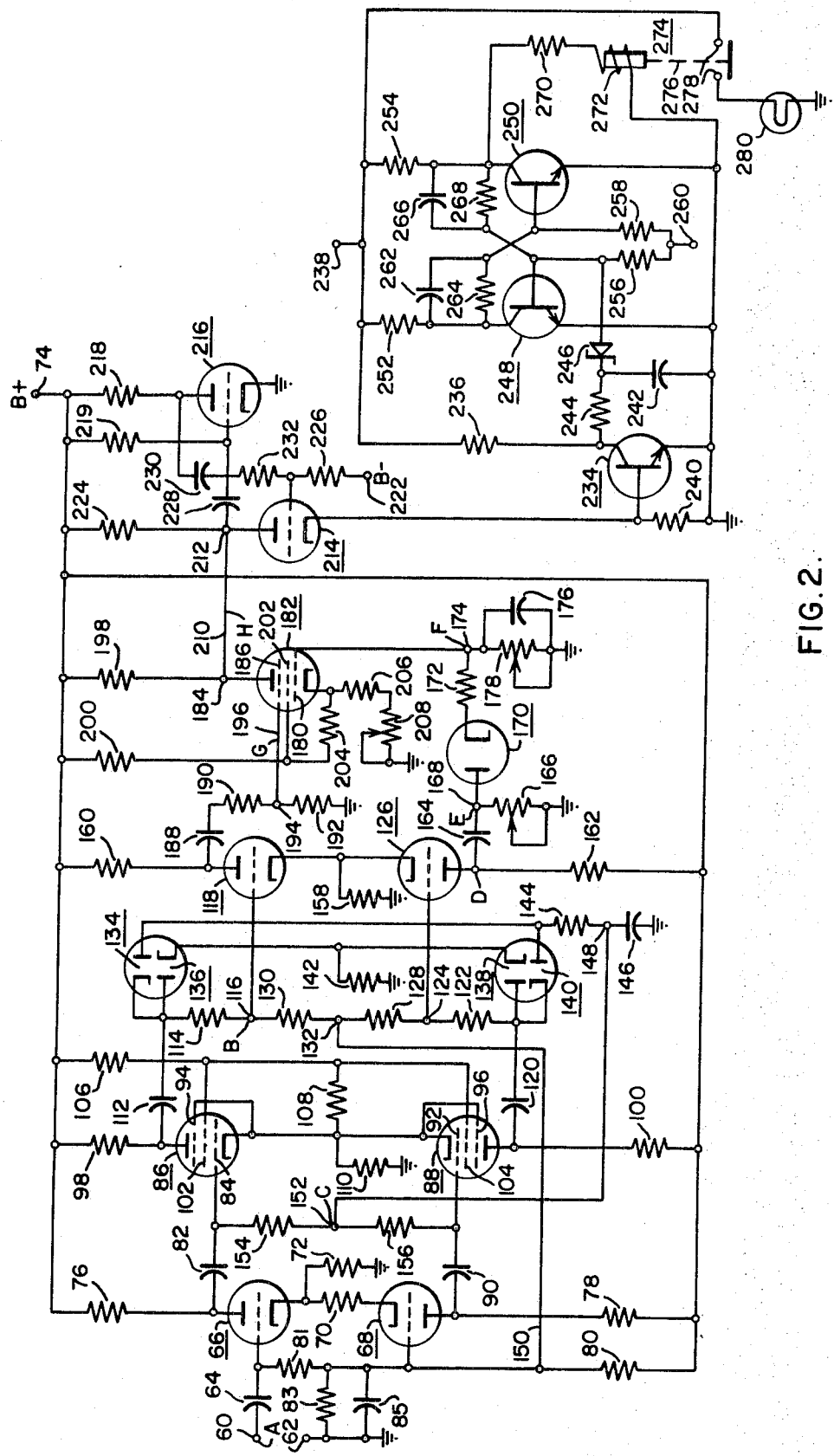
FIG. 2 is a schematic diagram showing the circuitry of the blocks of FIG. 1.

FIG. 2 shows specific circuitry which could be incorporated into the cardiac monitor as shown in block diagram of FIG. 1. The ECG wave form shown in curve A of FIG. 3 is supplied across a pair of input terminals 60—62, with the terminal 62 being grounded. The input ECG wave form is then applied through a coupling capacitor 64 to the grid of a triode vacuum tube 66. The tube 66 and a triode vacuum 68 form the active elements of a paraphase amplifier, which has a single ended input at the grid of the tube 66 and a double ended output appearing at the respective plates of the tubes 66 and 68. The cathode electrodes of the tubes 66 and 68 are coupled by a cathode resistor 70. A resistor 72 is connected between the cathode electrode of the tube 66 and ground to provide a current path through each of the tubes to ground. Bias potential is supplied to the plate of the tube 66 from a B+ source, to be connected at a terminal 74, through a bias resistor 76 connected between the B+ terminal 74 and the plate of the tube 66. The tube 68 is biased to be normally nonconductive when the tube 66 is conductive, and is biased from the B+ source through a resistor 78 connected between the terminal 74 and the plate of the tube 68. The grids of the tubes 66 and 68 have a small positive bias applied thereto, with a resistor 80 connected between the B+ terminal 74 and the grid of the tube 68 and a resistor 81 connected between the resistor 80 and the grid of the tube 66. A resistor 83 completes the grid bias circuit to ground being connected between the resistors 80 and 81 and ground. A capacitor 85 is connected across the resistor 83 to provide an a.c. bypass to ground.

Thus, income signals of a positive polarity are applied to the grid of the tube 66 and translated through the tube to appear at the plate electrode thereof, with the signal being coupled through a coupling capacitor 82 to the control grid 84 of a pentode vacuum tube 86. The tube 86 and a similar pentode tube 88 form the active elements of a gain control push-pull amplifying stage. When ECG input wave form has a positive polarity, the tube 66 of the paraphase stage is conductive and the tube 68 is nonconductive. The appearance of the negative polarity signal at the grid of the tube 66 causes this tube to be biased nonconductive. The tube 68 is then conductive so that signals corresponding to negative polarity input ECG signals appear at the plate electrodes thereof. These signals are translated through a coupling capacitor 90 to the control grid 92 of the pentode 88 of the push-pull stage.

The tubes 86 and 88 are connected in a push-pull fashion with the cathode electrodes commonly connected. The suppressor grids 94 and 96, respectively, are connected to the cathode electrodes of the associated tube. A bias resistor 98 is connected between the plate of the tube 86 and the B+ terminal 74, and a bias resistor 100 is connected between the plate of the tube 88 and the B+ terminal 74. The screen grids 102 and 104 of the tubes 86 and 88, respectively, are common connected and biased through a bias resistor 106 to the B+ terminal 74. A resistor 108 connects the screen grids 102 and 104 to the cathode electrodes of the tubes 86 and 88 with a resistor 110 being connected between the cathode electrodes and ground. The tubes 86 and 88 are operative in a push-pull fashion with a positive polarity signal appearing at the control electrode 84 from the plate of the tube 66 being amplified and appearing at the plate of the tube 86. These signals are coupled through a coupling capacitor 112 and a resistor 114 to appear at a junction 116 which is connected to the grid of triode tube 118. The negative polarity signals in the input ECG wave form are applied to the control grid 92 of the tube 88 and are amplified and appear at the plate of the tube 88. These signals are coupled through a coupling capacitor 120 and a resistor 122 to a junction 124 connected at the grid of vacuum tube 126. The junction points 116 and 124 are connected by a pair of resistors 128 and 130 connected in series with a junction 132 therebetween. A feedback connection is made by a lead 150 connected between the junction 132 and the grid of tube 68. The signal appearing at the junction 116 is that shown in curve B of FIG. 3. The amplified signal appearing at B is of slightly different wave shape than that of the input wave form of curve A due to the slight shaping resulting from the limitations of the time constants of the coupling capacitors.

As previously stated, the push-pull stage including the tubes 86 and 88 is gain controlled. The gain control is accomplished by providing a unidirectional automatic gain control signal which is fed back to the control grids of each of the tubes 86 and 88. This is accomplished by providing two pairs of rectifiers including the rectifiers 134, 136, 138 and 140. The cathode and anode electrodes of the rectifiers 134 and 136 are commonly connected and are coupled to the plate of the tube 86 through the coupling capacitor 112.

The anode and cathode electrodes, respectively, of the rectifiers 138 and 140 are commonly connected and coupled to the output at the anode of the tube 88 through the coupling capacitor 120. The cathodes of the rectifiers 136 and 138 are commonly connected and connected to ground through a resistor 142. The anodes of the rectifiers 134 and 140 are commonly connected to a resistor 144 which has its other end connected to ground through capacitor 146. A feedback path is provided from a junction 148 between the resistor 144 and the capacitor 146 through a lead 151 which is connected to a junction 152. The feedback path is completed to the control grids 84 and 92 of the tubes 86 and 88, respectively, through a resistor 154 and a resistor 156.

A negative potential is thus developed at the junctions 148 and 152 which is directly proportional to the signal magnitude appearing at the outputs of each of the tubes 86 or 88. This voltage serves as an automatic gain control voltage so that for low magnitude input signals a small feedback voltage is provided to the control grids of the tubes 86 or 88 so that signals applied thereto from the tubes 66 or 68 will be translated across the tube at relatively high gain. This will provide an output at the anodes of each of the tubes 86 or 88 of a relatively high amplitude within a selected range. Conversely, if a high magnitude input is applied to the control grids of the tubes 86 and 88, a relatively large magnitude negative control signal will be also applied to the control electrodes thereof which will tend to reduce the gains of these tubes so that the output appearing at the anodes of the tubes 86 or 88 will be reduced and held within predetermined limits. Thus, it can be seen that the output appearing at the anodes of the push-pull stage including the tubes 86 and 88 will be gain controlled and provide outputs having amplitudes within predetermined limits.

The gain controlled output wave forms appearing at the junctions 116 and 124 are applied, respectively, to the grids of the triode tubes 118 and 126, which comprise the active elements of the summing stage. The tubes 118 and 126 are connected in a push-pull manner, with their cathodes being commonly connected and a resistor 158 connected between the cathode to ground. Bias potential is applied to the plate of the tube 118 through a resistor 160 from the B+ terminal 74, and bias potential is applied to the plate of the tube 126 through a resistor 162 from the B+ terminal 74. It should be noted that the gain control voltage shown in curve C of FIG. 3 is not applied to the tubes 118 or 126 since this voltage is canceled due to the inverting action of the tubes 86 and 88, with the gain control signal canceled at the output of the summing stage tubes 118 and 126.

The output appearing at the plate of the tube 126 is shown in curve D of FIG. 3. This wave form D is substantially the same wave shape as curves A and B. The curve D wave form is applied to a differentiating circuit including a capacitor 164 and a variable resistor 166. One end of the capacitor is connected to the resistor 166, the other end of the resistor being grounded. The wave form which appears at a junction 168 between the capacitor 164 and the resistor 166 is the derivative of the wave form D and is shown at curve E of FIG. 3. The differentiated output appearing at the junction 168 is rectified in a rectifier tube 170 to provide a positive polarity unidirectional signal. The anode of the diode 170 is connected to the junction 168 and the cathode thereof is connected to a resistor 172, which has its other end connected to a junction 174. Between the junction 174 is connected an integrating circuit, including the parallel combination of a capacitor 176 and a variable resistor 178. The time constant of the integrating circuit including the capacitor 176 and the variable resistor 178 is selected to be appropriate to the wave form; so that a sufficient time delay occurs to permit coincidence under normal conditions by the change caused by the positive portion R of the ECG wave form to be maintained a sufficient time on the capacitor 176 of the integrating circuit. The wave form of curve F of FIG. 3 appears at the junction 174 and is applied to the control electrode 180 of a pentode tube 182.

The tube 182 acts as a coincidence tube. In order for the tube to be rendered conductive and provide an output wave form H at its plate electrode at the junction 184, a positive polarity signal must be applied to both its control grid 180 and its suppressor grid 186. The input to the suppressor grid 186 is supplied by the tube 118 of the push-pull summing stage. The output from the tube 118 is taken from the anode thereof and passed through a coupling capacitor 188 to the voltage divider including a resistor 190 and a resistor 192 with the other end of the resistor 192 being grounded. At a junction 194 between the voltage divider resistors, a lead 196 connects the suppressor grid 186 to the voltage divider. The signal developed at the suppressor grid 186 is shown in curve G of FIG. 3. The wave form G is substantially the same shape as the curve D inverted 180° due to the phase shift of tube 118.

The inputs to the coincidence tube 182 are thus; the wave form F at the control grid 180 and the wave form G at the suppressor grid 186. The coincidence tube 186 is biased to be normally nonconductive through a plate bias resistor 198 connected between the plate and the B+ terminal 74 and a bias resistor 200 connected between the screen grid 202 and the B+ terminal 74. A resistor 204 is connected between the screen grid 202 and the cathode electrode of the tube 182. A series combination of a resistor 206 and a variable resistor 208 are connected between the cathode and ground of the coincidence circuit to complete the circuit.

Referring to FIG. 3, curves F, G and H, a comparison of these wave forms for the normal high P and long QRS complex conditions illustrates the operation of the circuit. As explained previously, at the time T1 of the normal wave form case, positive polarity pulses 40 and 42 will be applied, respectively, to the control grid 180 and the suppressor grid 186; thus the tube 182 will be rendered conductive to apply an output pulse 44, curve H, indicative of the conduction of the tube 182, to an alarm circuit 210. Also for the high P case, positive polarity pulses 46 of curve F and 48 of curve G will be applied to the grids 180 and 186, respectively, which will cause tube 182 to be rendered conductive.

However, considering the long QRS condition, the pulse 52, curve F, having gone through the operations of being differentiated in the differentiating circuit including the capacitor 164 and the resistor 166, rectified in passing through the rectifier 170 and then integrated in the integrating circuit including the capacitor 176 and the resistor 178, is so processed that it does not have a positive polarity at the time T3, the pulse 52 having terminated somewhat before this time. The positive polarity pulse 54 of the wave form G is applied to the suppressor grid 186. However, since no positive polarity signal is applied to the control grid 180, no coincidence of positive polarity pulses occurs at the tube 182, and, therefore, the tube remains in its nonconductive state.

To sense whether abnormal heart conditions exist, the output plate of the coincidence tube 182 is applied to a monostable multivibrator 214, 216 through a lead 210 connected between the junction 184 and a junction 212 at the plate of a triode vacuum tube 214. The tube 214 and a tube 216 comprise the active elements of a conventional monostable multivibrator circuit. The monostable multivibrator circuit is so arranged that the tube 216 is normally conductive whenever the coincidence tube 182 is nonconductive, that is, when a pulse output, shown in curve H, is not provided from the coincidence tube 182. The tube 216 is biased from the B+ terminal 74 through a resistor 218 to the plate thereof and a resistor 219 to the grid thereof. The tube 214 is biased from the B+ terminal 74 to the plate thereof through a resistor 224. A resistor 226 connects the grid of the tube 214 to a B− terminal 222 to which a negative source of potential is to be connected. A capacitor 228 is connected between the plate of the tube 214 and the grid of the tube 216. A series combination of a capacitor 230 and a resistor 232 is connected between the plate of the tube 216 and the grid of the tube 214. The cathode of the tube 216 is grounded.

The monostable multivibrator operates in a conventional manner, so that, when the coincidence tube 182 is rendered conductive, a pulse such as shown in curve H of FIG. 3, is applied to the plate, at the junction 212, of the tube 214 which renders the tube 214 conductive. The conduction of the tube 214 renders the tube 216 nonconductive. After the coincidence tube 182 returns to its nonconductive state, the monostable multivibrator returns to its stable state after capacitor 230 discharges through resistor 219 with the tube 216 being biased to its stable conductive state thereby turning off the tube 214. Thus, the monostable multivibrator switches to one state whenever the coincidence tube 182 is turned on and back after a time determined by capacitor 230 and resistor 219. By sensing the rate of switching of the monostable multivibrator, the rate of heart beat can be determined to ascertain whether the heart is beating either too fast or too slow if this information is desired. Also, the absence of the monostable multivibrator switching states is indicative of an abnormal heart condition associated with a long QRS wave form. The failure of the monostable multivibrator to switch to its unstable state can thus be used as an indication of the malfunction of the heart.

The cathode of the tube 214 is connected through a lead 233 to the base of a transistor 234, which is connected in a common emitter configuration. The transistor is biased to be in a normally nonconductive state when the monostable multivibrator is in its stable state with the tube 216 conductive. A resistor 236 is connected between the collector of the transistor 234 and a terminal 238 to which a source of positive polarity suitable for biasing a transistor is to be connected. A resistor 240 is connected between the base and the emitter electrodes of the transistor 234. With the transistor 234 in its nonconductive state, a capacitor 242 charges from the terminal 238 through the resistor 236, a resistor 244 connected between the collector of the transistor 234 and one end of the capacitor 242, the other end of the capacitor being grounded. When the monostable multivibrator switches state, with the tube 214 being rendered conductive, the tube 216 rendered nonconductive, a positive potential is applied to the base of the transistor 234 which renders this transistor conductive. The previously charged capacitor 242 is then discharged through the resistor 244 and the collector-emitter circuit of the transistor 234 to ground. The time constant of the charging circuit including the capacitor 242 is so selected that the capacitor only charges to a predetermined voltage during the time period between the normal occurrence of the coincidence output pulses as shown in curve H of FIG. 3. Thus, under normal ECG wave form conditions, coincidence pulses will be provided to the monostable multivibrator which in turn will trigger on the transistor 234 during each cycle of the heart beat which will cause the capacitor 242 to be discharged before a given charge voltage has developed across the capacitor 242.

However, when an abnormal heart condition is provided and no coincidence signal is applied to the monostable multivibrator, the monostable multivibrator remains in its stable state so that the transistor 234 remains in its nonconductive state. Thus, charge on the capacitor 242 has sufficient time to charge to a greater than its normal charging voltage. To sense whenever an excessive voltage is developed across the capacitor 242, a Zener diode 246 is connected to the ungrounded end of the capacitor 242 through its cathode electrode. The Zener diode 246 is so selected that it will not breakover until an excessive voltage is developed at the capacitor 242. Thus, whenever coincidence signals are applied to turn on the transistor 234, the Zener 246 operates as an open circuit to isolate the capacitor 242 from subsequent circuitry. However, when an excessive voltage is developed at the capacitor 242 due to the failure of the transistor 234 to be turned on, the Zener 246 will breakover to provide a signal to the base electrode of a transistor 248 of a bistable multivibrator.

The bistable multivibrator as shown is conventional and includes as its active elements the transistor 248 and a transistor 250. The bistable multivibrator is set up so that the transistor 250 is normally conductive under normal heart conditions, with the transistor 248 being normally nonconductive. Each of the transistors 248 and 250 have their emitters grounded, with bias resistors 252 and 254 connected, respectively, between the collectors thereof and the terminal 238. To the bases the transistors 248 and 250 are connected, resistors 256 and 258, respectively. The other end of the resistors 248 and 250 are commonly connected to a terminal 260 to which a source of negative potential suitable for transistor biasing is to be connected. A parallel circuit combination of a capacitor 262 and a resistor 264 is connected between the collector of the transistor 248 and the base of the transistor 250, while a parallel combination of a capacitor 266 and a resistor 268 are connected between the collector of the transistor 250 and the base of the transistor 248 to complete the bistable multivibrator.

The anode of the Zener diode 246 is connected to the base of the transistor 248. Thus, whenever an excessive voltage is developed across the capacitor 242 to breakover the Zener diode 246, a positive polarity signal is applied to the base of the transistor 248 which renders this transistor conductive. The turning on of the transistor 248 causes the transistor 250 to be switched to its nonconductive state. A load circuit is connected to the collector of the transistor 250 and includes a resistor 270 and the coil 272 of a relay 274, with the bottom end of the coil 272 being grounded. The relay 274 includes a plunger 276 and a pair of contacts 278. Contacts 278 are connected in series between the terminal 238 and an indicating light 280, which has its other end grounded. With the transistor 250 normally conductive, the relay coil 272 is deactivated with the contacts 278 normally open circuited. However, switching of the bistable multivibrator to its other stable state with the transistor 250 nonconductive, energizes the coil 272 with a relatively low impedance path being provided from the terminal 238, through the resistors 254 and 270 to the coil 272. The energization of the coil 272 causes the relay 274 to operate and close the contacts 278; thus completing an electrical circuit to the indicator light 280 to provide a visual indication that an abnormal heart condition exists. Of course, other indicating means could be utilized in place of the light bulb 280 if desired such as an audible alarm.

It can, therefor, be seen that the circuit as embodied in FIG. 2 functions to detect only the long QRS complex, while the normal wave form or high P wave form would not supply alarm signals. The circuit does not depend upon amplitude detection or require a filter to pass the band of the QRS complex, and thus avoids the problems in this regard as discussed above. The circuit of FIG. 2 also is substantially free from interferences such as caused by 60-cycle interference, and also permits operation over a wide range of amplitude variations due to the gain control feature of the circuitry, which causes the signal being processed to be held within predetermined amplitude levels. It has been found that input ECG wave form amplitudes can be effectively utilized in the present apparatus which has up to a 5 to 1 variation in amplitude levels.

In addition, the output of the tubes 214 and 216 may be used to energize a rate detector to determine whether the cardiac rate is within proper bounds.

FIG. 2 shows an embodiment of the present invention using vacuum tubes and transistors. It should be apparent that the tubes as shown could be replaced with their transistor or solid state equivalents and vice versa.

Although the present invention has been described with a certain degree of particularity it should be understood that the present disclosure has been made only by way of example and that numerous changes in the details of construction and assembly, the combination and arrangement of parts, elements and components can be resorted to without departing from the scope and spirit of the present invention.

I claim:

1. In cardiac monitor apparatus for sensing normal electrical signals generated by the heart of a living subject, the combination of: input means for receiving electrical signals generated by the heart of a living subject; gain controlled amplifying means for controlling the amplitude of said electrical signals and providing two outputs; signal processing means for receiving one of the outputs of said amplifying means and holding the signals applied thereto to a predetermined time delay with reference to the unprocessed signals from the other output of said amplifying means; and comparison means to receive the signals from said signal processing means and the signals from the other output of said amplifying means and compare these signals to provide an indication when normal electrical signals are received from the heart and to reject and not respond to abnormal signals.

2. In cardiac monitor apparatus for sensing normal electrical signals generated by the heart of a living subject, the combination of: input means for receiving the electrical signals generated by the heart of a living subject; gain controlled amplifying means for controlling the amplitude of said electrical signals and providing two outputs; means for differentiating the electrical signal provided by one of said outputs from said gain controlled amplifying means and for rectifying the differentiated electrical signals; and comparison means to receive the rectified signals and the signals from the other output of said amplifying means and to compare these signals to provide an indication when normal electrical signals are received from the heart and reject abnormal signals.

3. In cardiac monitor apparatus for sensing normal electrical signals generated by the heart of a living subject, the combination of: input means for receiving electrical signals generated by the heart of a living subject; gain controlled amplifying means for controlling the amplitude of said electrical signals and providing two outputs; differentiating means for differentiating the electrical signal provided by one of said outputs from said gain controlled amplifying means; unidirectional means for rectifying the differentiated electrical signals from said differentiating means; and comparison means to receive the rectified signals and the signals from the other output of said amplifying means and compare these signals to provide an indication when normal electrical signals are provided by the heart or when normal electrical signals are not received at a proper rate.

4. In cardiac monitor apparatus for sensing normal electrical signals generated by the heart of a living subject, the combination of: input means for receiving electrical signals generated by the heart of a living subject; gain controlled amplifying means for controlling the amplitude of said electrical signals and providing two outputs; differentiating means for differentiating the electrical signals provided by one of said outputs from said gain controlled amplifying means; unidirectional means for rectifying the differentiated electrical signals from said differentiating means; integrating means for integrating the output of said unidirectional means; and comparison means to receive the output of said integrating means and the other output from said amplifying means and compare these outputs to provide an indication when normal electrical signals are received from the heart and to reject abnormal signals.

5. In cardiac monitor apparatus for detecting abnormal heart conditions by sensing the ECG wave form as generated by the heart of a living subject, the combination of: push-pull amplifying means for receiving said ECG wave form and providing dual outputs therefrom; feedback means for feeding back the output of said push-pull amplifying means to the input thereof to control the gain of said push-pull amplifying means so that the amplitude of said ECG wave form is held within predetermined limits; differentiating means for differentiating the signals from one of the outputs of said push-pull amplifying means; unidirectional means for rectifying the differentiated output of said differentiating means; integrating means for integrating the output of said unidirectional means; comparison means for receiving the signals from the other output of said push-pull amplifying means and the output from said integrating means and being not responsive to an abnormal heart condition as indicated by a long QRS complex appearing in the input ECG wave form; and alarm means to be activated by failing to be inhibited by the presence of a normal signal in response to said comparison means to give an indication of an abnormal heart condition.

6. In cardiac monitor apparatus for detecting abnormal heart conditions by sensing the ECG wave form as generated by the heart of a living subject, the combination of: paraphase amplifying means for receiving said ECG wave form; push-pull amplifying means for receiving the output of said paraphase amplifying means and providing dual outputs therefrom; feedback means for feeding back the outputs of said push-pull amplifying means to the input thereof to control the gain of said push-pull amplifying means so that the amplitude of said ECG wave form is held within predetermined limits; differentiating means for differentiating the signals from one of the outputs of said push-pull amplifying means; unidirectional means for rectifying the differentiated output of said differentiating means; integrating means for integrating the output of said unidirectional means; and comparison means for receiving the signals from the other output of said push-pull amplifying means and the output from said integrating means and being nonresponsive to an abnormal heart condition existing as indicated by a long QRS complex appearing in the input ECG wave form; and alarm means to be activated in response to said comparison means by failing to be inhibited by the presence of a normal signal to give an indication of an abnormal heart condition.

7. In cardiac monitor apparatus for detecting abnormal heart conditions by sensing the ECG wave form as generated by the heart of a living subject, the combination of: paraphase amplifying means for receiving said ECG wave form; push-pull amplifying means for receiving the output of said paraphase amplifier and providing dual outputs therefrom; feedback means for feeding back the outputs of said push-pull amplifying means to the input thereof to control the gain of said push-pull amplifier so that the amplitude of said ECG wave form is held within predetermined limits; a push-pull summing stage for receiving the gain control output from said push-pull amplifying stage and providing two outputs having signals corresponding to the input ECG wave forms; differentiating means for differentiating the signals from one of the outputs of said summing stage; unidirectional means for rectifying the differentiated output of said differentiating means; integrating means for integrating the output of said unidirectional means; and comparison means for receiving the signals from the other output of said summing stage and the output from said integrating means and being nonresponsive to an abnormal heart condition existing as indicated by a long QRS complex appearing in the input ECG wave form.

8. In cardiac monitor apparatus for detecting abnormal heart conditions by sensing the ECG wave form as generated by the heart of a living subject, the combination of: a paraphase amplifier for receiving said ECG waveform; a push-pull amplifier for receiving the output of said paraphase amplifier and providing dual outputs therefrom; feedback means for feeding back the outputs of said push-pull amplifier to the input thereof to control the gain of said push-pull amplifier so that the amplitude of said ECG wave form is held within predetermined limits; a push-pull summing stage for receiving the gain control output from said push-pull amplifying stage and providing two outputs having signals corresponding to the input ECG wave forms; differentiating means for differentiating the signals from one of the outputs of said summing stage; unidirectional means for rectifying the differentiated output of said differentiating means; integrating means for integrating the output of said unidirectional means; comparison means for receiving the signals from the other output of said summing stage and the output from said integrating means and being nonresponsive to an abnormal heart condition existing as indicated by a long QRS complex appearing in the input ECG wave form; and alarm means not being inhibited in response to said comparison means to give an indication of an abnormal heart condition.